US007571921B1

(12) United States Patent
Hoeve

(10) Patent No.: US 7,571,921 B1
(45) Date of Patent: Aug. 11, 2009

(54) SEAT MOUNTING ON A COSMETIC PAINTED FENDER

(75) Inventor: Jason William Beiber Hoeve, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 337 days.

(21) Appl. No.: 11/415,904

(22) Filed: May 2, 2006

(51) Int. Cl.
*B62D 61/02* (2006.01)

(52) U.S. Cl. ............... 280/288.4; 224/413; 297/195.13; 180/219

(58) Field of Classification Search ................. 180/219; 280/288.4; 297/195.1, 195.13; 224/413, 224/429, 430, 440; 293/105, 106
See application file for complete search history.

(56) References Cited

U.S. PATENT DOCUMENTS

| | | | |
|---|---|---|---|
| 3,927,727 A | 12/1975 | Hanagan | |
| 5,322,345 A | 6/1994 | Desser et al. | |
| 5,558,260 A * | 9/1996 | Reichert | 224/413 |
| 5,575,528 A | 11/1996 | Netz | |
| 5,931,360 A | 8/1999 | Reichert | |
| 6,019,422 A * | 2/2000 | Taormino et al. | 297/195.1 |
| 6,135,473 A * | 10/2000 | Wright | 280/202 |
| 6,648,408 B1 | 11/2003 | Grove | |
| 6,854,792 B2 * | 2/2005 | Tsukahara | 296/203.02 |
| 6,913,099 B2 | 7/2005 | Scott | |
| 7,036,837 B1 * | 5/2006 | Bauer et al. | 280/288.4 |
| 7,275,787 B1 * | 10/2007 | Grove | 297/215.12 |

* cited by examiner

*Primary Examiner*—Tony H. Winner
(74) *Attorney, Agent, or Firm*—Baker & Daniels LLP

(57) ABSTRACT

The present device includes a removable system for an accessory assembly mounted to the fender of a motorcycle. The accessory is generally attached to a bracket that mates with an attachment member connected to the fender. Fasteners may be utilized to ensure that the bracket remains joined to the attachment member. Upon removal of the fasteners, the bracket may be separated from the attachment member. When the accessory is removed from the fender, the attachment member represents an aesthetically pleasing component of the fender. In addition, the attachment member also provides protection for the fender so that when the accessory is attached to the fender, the accessory does not damage the paint thereof.

16 Claims, 5 Drawing Sheets

36 132 22 162 130 140 142 156 156 104 102 92 90 96 100 104 120 112 94 34 122 110 154 152 32 66 80 54 152 50 60 64 82 80 56 62 66 84 82 68 52 72 150 60 70 64 62 46 44 150 44 40 46 30 46 44 42

SEAT MOUNTING ON A COSMETIC PAINTED FENDER

BACKGROUND OF THE INVENTION

1. Field of the Invention

This invention relates generally to motorcycles. More specifically, the present invention relates to the mounting of accessories on a motorcycle fender.

2. Description of the Related Art

U.S. Pat. No. 3,927,727 discloses a Vehicular Seat and Fairing Assembly. The vehicular seat and fairing assembly is suited for use on a two wheel vehicle, such as a motorcycle. This assembly includes a fairing and a seat supported thereon. The fairing is preferably made of a weather resistant material and is capable of withstanding exposure to the type of elements to which motor vehicles are commonly subjected. The fairing has a substantially U-shaped configuration defined by a pair of depending side walls, a rear wall and a top wall. The seat functions as support for both the driver of the vehicle and a passenger. The seat is suitably mounted on the outside surface of the top wall of the fairing, and the fairing is capable of accommodating seats of differing sizes and configurations. The fairing, with the seat mounted thereon, is pivotably supported on a frame of the vehicle, allowing for movement between a lowered locked position and a raised unlocked position. A latching means automatically locks the seat and fairing assembly when in the lowered position. Accessories comprising signal lights, a tail light and license plate are mounted to the assembly. The signal lights are supported by the exterior surface of the side walls of the fairing, while the tail light and license plate are mounted to the rear wall of the fairing.

U.S. Pat. No. 5,322,345 discloses a Removable Motorcycle Fender Seat. The removable motorcycle fender seat allows owners of any motorcycle having a rear fender assembly to removably install a second auxiliary seat. The seat is constructed of light weight material and may be affixed to the fender by way of a plurality of suction cups and magnetic forces. In additional embodiments of the invention, the magnetic strip alone or the suction cups alone may be utilized to attach the seat to the fender.

U.S. Pat. No. 5,575,528 discloses a Motorcycle Rear Fender Cover. The rear fender cover affixes to the arcuate portion of a motorcycle seat and extends rearward therefrom. The fender cover comprises a thin section of material conforming generally to the contour of the motorcycle fender. The fender cover includes a base plate and a decorative top.

U.S. Pat. No. 5,931,360 discloses a Detachable Motorcycle Passenger Seat and/or Luggage Rack. The patent also discloses a method of attaching the auxiliary passenger seat, luggage rack or combination to a motorcycle. The method includes the step of adding short spacers to a plurality of fender attachment bolts of the motorcycle. An alternative method includes the step of adding mounting pins to the motorcycle. The methods also include steps of providing a seat including a plurality of hooks mating with the spacers or pins, engaging the hooks to the spacers or pins, and engaging a latch, thereby preventing the hooks from slipping off the spacers or pins. The latch disclosed in the patent is easily unlatched to allow for the quick removal of the passenger seat and luggage rack when desired.

U.S. Pat. No. 6,648,408 discloses a Second Seat Assembly for a Motorcycle. The second seat assembly is removably mounted over the rear fender of the motorcycle. The second seat assembly is attached to the fender by way of hook members capable of engaging a plurality of recesses formed in fender struts. The fender struts are mounted in conjunction with the fender. The second seat assembly is tightly secured to the fender in order to avoid vibration and noise.

U.S. Pat. No. 6,913,099 discloses a Mounting Configuration and Method for a Motorcycle Seat. The mounting configuration of the motorcycle includes a frame and a seat mounting stud. The seat mounting stud extends upwardly from a seat support portion of the frame. The seat assembly includes a seat pan having a forward mounting tab coupled to the frame adjacent a fuel tank, a rearward mounting tab coupled to a rear fender and extending rearwardly from the seat pan, and a mounting aperture positioned between the forward and rearward mounting tabs. The mounting stud is received by the mounting aperture and cooperates with the mounting tabs in order to couple the seat assembly to the frame. In addition, the patent provides for a method of installing the disclosed seat assembly.

SUMMARY OF THE INVENTION

An embodiment of the present invention includes an assembly for attaching an accessory to a fender. The assembly includes a bracket having a locating portion and a mating portion. The bracket is attachable to the accessory, and an attachment member may be attached to the fender. The attachment member includes a receiving area for receiving and retaining the bracket.

In embodiments of the invention, the mating portion includes at least one protrusion. At least one protrusion may be profiled as a tongue extension. In addition, the receiving area may be profiled to include at least one slot configured to receive the protrusion. In embodiments of the invention, the assembly includes two protrusions and two slots.

In embodiments of the invention, the attachment member is plated with chrome. In addition, the attachment member may be permanently attached to the fender. Also, the accessory may be a passenger seat.

In embodiments of the invention, the fender may include at least one mounting member. The mounting member may allow for the mounting of the attachment member. The bracket locating portion may include an aperture aligned with at least one of the mounting members. The accessory may be attached by way of a fastener extending through the accessory, the bracket locating portion and into at least one mounting member.

An embodiment of the invention includes a seat mounted to a fender. The seat includes a seat portion, a bracket attached to the seat portion and a rubber spacer. The bracket includes an aperture and a mating portion having at least one protrusion. The rubber spacer may be positioned intermediate the fender and the seat portion. The fender includes at least one slot configured to receive at least one protrusion.

In embodiments of the invention, the fender includes an attachment member comprising a slot. The attachment member may include a receiving area, and the bracket may include a shaped portion. The shaped portion may be received within the receiving area. In addition, the attachment member may be plated with chrome. The fender may include at least one mounting member capable of supporting the attachment member. In embodiments of the invention, the mounting member includes an aperture, and the receiving area includes an aperture aligned with the aperture of the mounting member.

In embodiments of the invention, the seat includes a rubber spacer connected to the seat. The bracket may include a pair of protrusions, and the fender may include a pair of slots configured to receive the protrusions. In embodiments of the invention, the protrusions are positioned proximate a first end of the bracket, and the apertures are positioned proximate the second end of the bracket.

In embodiments of the invention, a fastener extends through the seat, the bracket, and into the fender.

An embodiment of the invention includes a motorcycle comprising a frame, a power train for powering the motorcycle, a front wheel, a rear wheel, a rear fender positioned over the rear wheel, a bracket including a locating portion and a mating portion, an attachment member mounted to the fender and having a receiving area for receiving and retaining a bracket and an accessory joined to the bracket.

In embodiments of the invention, the attachment member is chrome plated. The fender may include a plurality of mounting members allowing for the mounting of the attachment member to the fender. In embodiments of the invention, the receiving area receives the locating portion of the bracket. The attachment member may further include at least one slot configured to receive the mating portion of the bracket.

In embodiments of the invention, the locating portion includes a shaped portion and an aperture positioned within the shaped portion. In addition, the receiving area is configured to receive the shaped portion.

DETAILED DESCRIPTION OF THE EMBODIMENTS OF THE INVENTION

Figure 1:
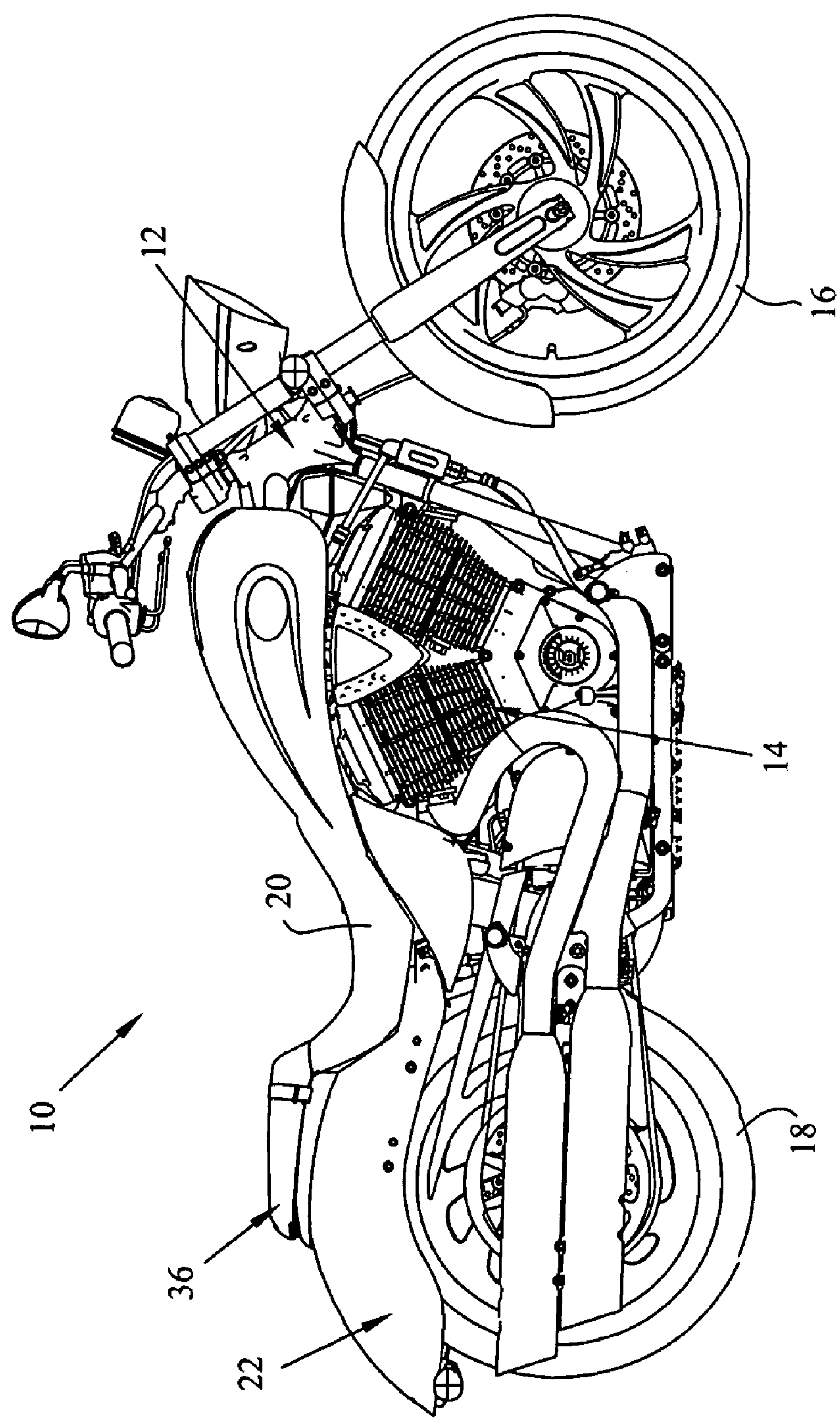
FIG. 1 is a side view of a motorcycle embodying an aspect of the present invention.

FIG. 1 illustrates a motorcycle generally indicated by numeral 10. It should be noted that, generally, a majority of the components of motorcycle 10 may be of a type known in the art and is being described for exemplary purposes. Motorcycle 10 includes a frame 12 and a power train 14 for powering the motorcycle. Motorcycle 10 further includes a front wheel 16 and a rear wheel 18. Front wheel 16 may be connected to the frame 12, and rear wheel 18 may be connected to the frame 12 and power train 14. A seat 20 is mounted upon the upper portion of frame 12. A rear fender assembly 22 represents an embodiment of the invention and is positioned above rear wheel 18.

Figure 2:
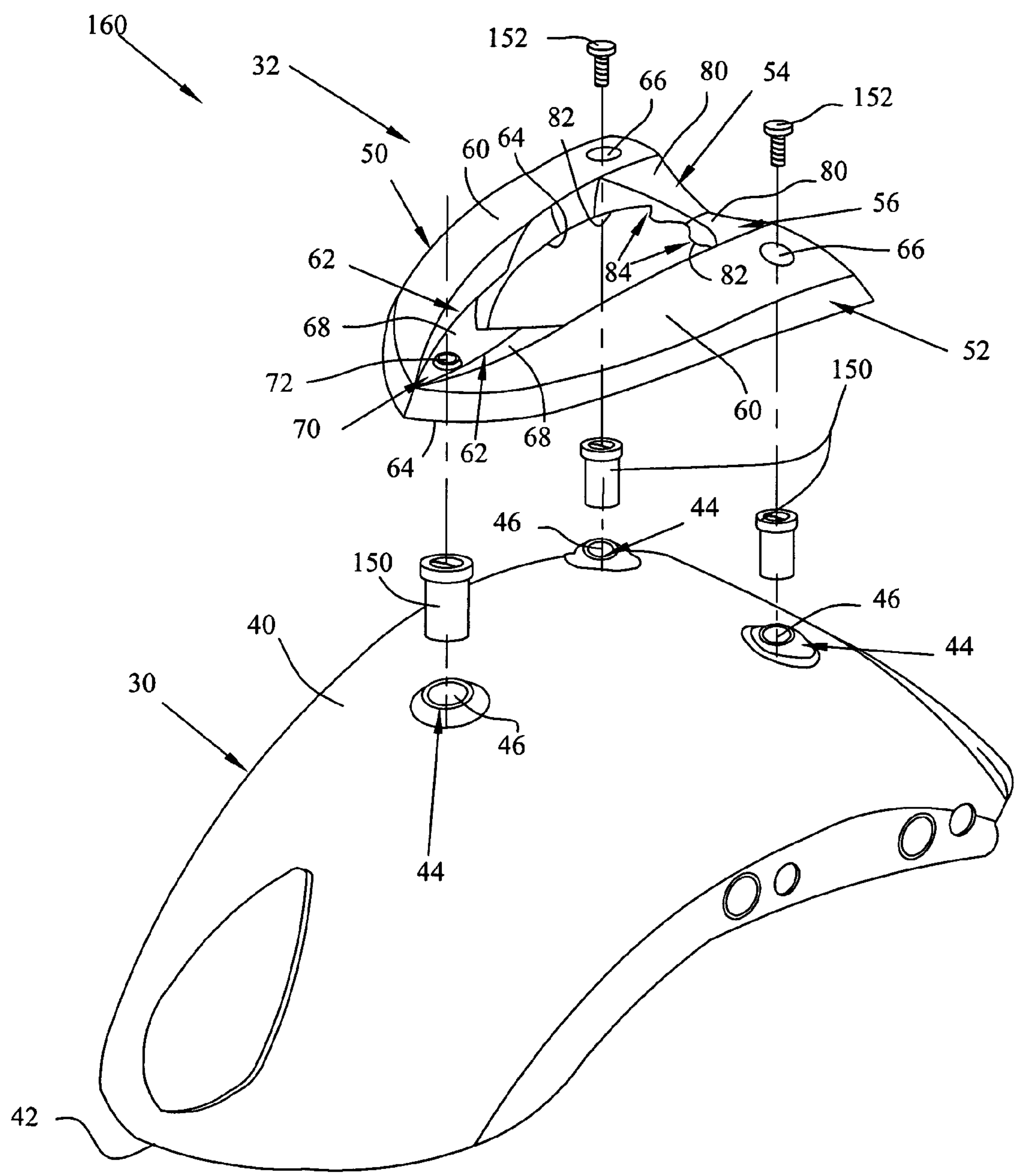
FIG. 2 is a perspective view of a portion of an embodiment of the present invention depicting the fender and attachment member.

FIG. 2 depicts an exploded perspective view of rear fender assembly 22. In the present embodiment, rear fender assembly 22 is generally comprised of a fender 30, an attachment member 32, bracket 34 and accessory 36. It should be noted that accessory 36 may be of any type of accessory known in the art, such as a luggage rack or a seat. In the present embodiment, for ease of description purposes only, however, accessory 36 is depicted as a seat.

In the present embodiment, fender 30 includes an upper surface 40 and an under surface 42 located opposite the upper surface 40. The upper surface 40 may have any configuration generally known in the art, and in the present embodiment, the upper surface 40 represents a finished cosmetic surface with a generally arcuate shape. Upper surface 40 includes a plurality of mounting members, each generally indicated by numeral 44. Each of the mounting members 44 includes an aperture 46 extending therethrough. Each aperture 46 extends completely through fender 30 from the upper surface 40 to the under surface 42.

Referring still to FIG. 2, attachment member 32 includes a first member 50 and a second member 52, a first extension 54 and a second extension 56. Attachment member 32 may be manufactured from any hardened material and, if desired, may be chrome plated.

In the present embodiment of the invention, first extension 54 extends away from first member 50 in the direction of second member 52. Similarly, second extension 56 extends away from second member 52 in the direction of first member 50. In the present embodiment of the invention, these components 50, 52, 54, 56 may all be integrally formed from a single piece of material. In embodiments of the invention, however, the attachment member 32 may comprise separate components later affixed to each other in a manner known to achieve the depicted configuration.

First member 50 and second member 52 generally have mirrored configurations. In the present embodiment, first member 50 includes an upper surface 60, a formed upper surface 62 and an under mating surface 64. Under surface 64 is positioned on the underside of first member 50 and has a shape complementary to upper surface 40 of fender 30. Upper surface 60 includes an aperture 66 extending therethrough and is substantially smooth. Formed upper surface 62 is also smooth and includes recessed areas 68.

As explained above, second member 52 is a mirror image of first member 50. Accordingly, second member 52 includes an upper surface 60, a formed surface 62, an under surface 64 and an aperture 66 extending through the upper surface 60. The positioning of the recessed areas 68 of the formed surfaces 62 creates a larger recess 70, which includes an embossed aperture 72 formed therein.

First extension 54 and second extension 56 are mirror images of each other. Each extension 54, 56 includes an upper surface 80 and a lower surface 82. In the present embodiment of the invention, upper surface 80 is substantially smooth in configuration. Lower surface 82, however, includes at least one slot 84, but as shown includes two slots, as will be described herein.

Figure 3:
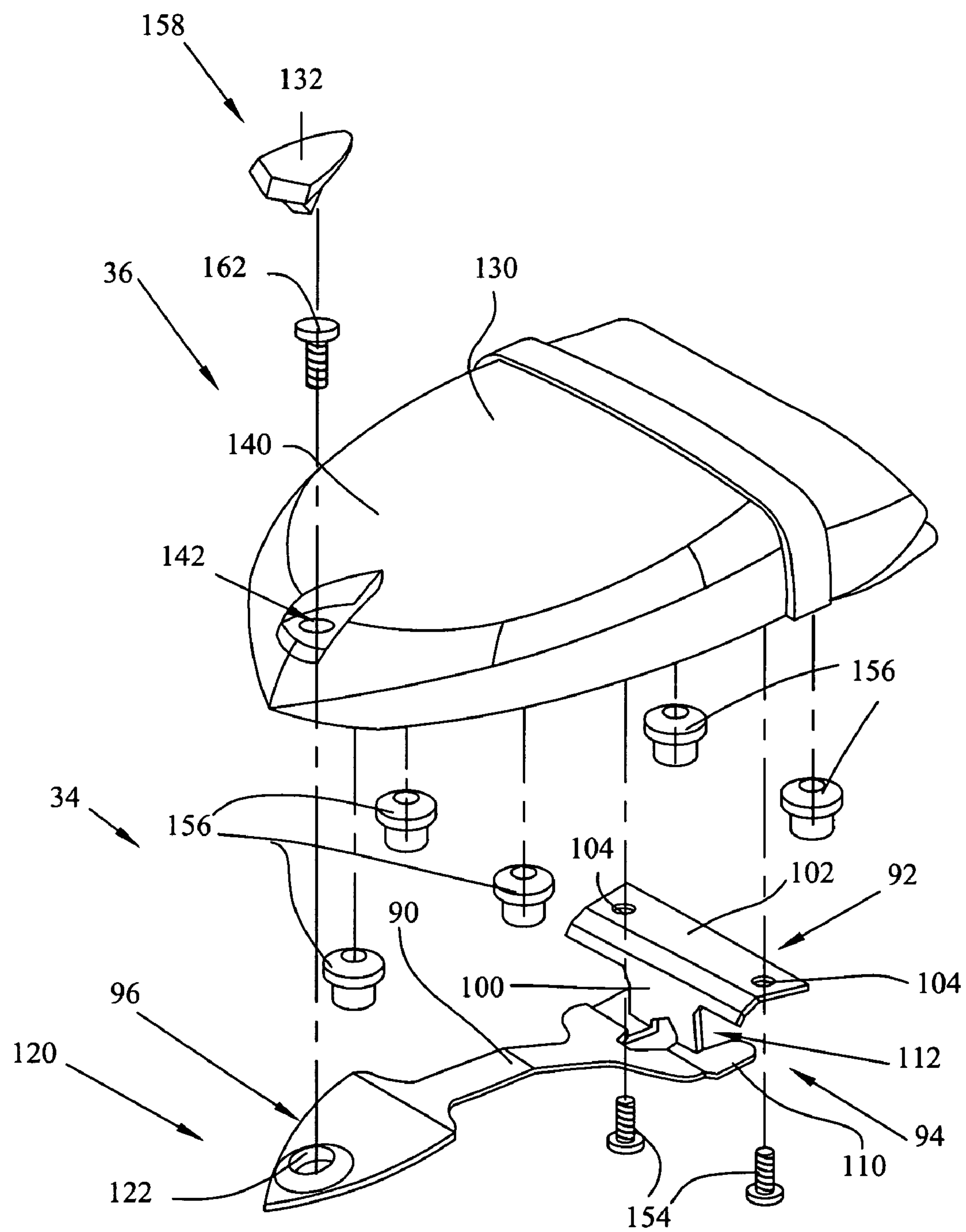
FIG. 3 is a perspective view of a portion of an embodiment of the present invention depicting the seat and mounting bracket.

With reference to FIG. 3, in the present embodiment of the invention, bracket 34 includes a body 90, a support portion, generally indicated by numeral 92, a mating portion, generally indicated by numeral 94, and a locating portion, generally indicated by numeral 96. Bracket 34 may be manufactured from any sturdy material, such as a metal. In the present embodiment of the invention, body 90 represents an elongated portion of bracket 34 positioned intermediate the support portion 92 and the locating portion 96.

In the present embodiment of the invention, support portion 92 includes a vertical portion 100 and a horizontal portion 102. Vertical portion 100 extends upwards from body 90 and may be integrally formed with body 90. Similarly, horizontal portion 102 extends horizontally from vertical portion 100. In the present embodiment, horizontal portion 102 extends away from the edge of vertical portion 100 in the direction away from body 90. In addition, in the present embodiment of the invention, horizontal portion 102 includes a plurality of apertures, each generally indicated by numeral 104. The apertures 104 are located proximate the outside edges of the horizontal portion 102.

In the present embodiment of the invention, mating portion 94 includes a plurality of protrusions, each generally indicated by numeral 110. The protrusions 110 are sized and configured in the embodiment shown, as tongues extending outwardly, and profiled to be received within the slots 84 of the extensions 54, 56. The protrusions 110 are spaced apart, thereby forming a gap generally indicated by numeral 112. Gap 112 is sized to ensure that the distance separating the protrusions 110 is substantially identical to the distance separating the slots 84 in the attachment member 32.

In the present embodiment of the invention, the locating portion 96 of bracket 34 extends away from body 90. Locating portion 96 is positioned with respect to body 90 opposite the support portion 92 and the mating portion 94. Locating portion 96 includes a formed area 120, having a shape complementary to recess 70 of attachment member 32, thereby allowing for the positioning of formed area 120 within recess 70 when desired. Formed area 120 includes an aperture 122. Aperture 122 is positioned within formed area 120 so that aperture 122 aligns with aperture 72 when formed area 120 resides within recess 70.

Referring still to FIG. 3, accessory 36 is generally depicted as a passenger seat. It should be noted that the depiction of accessory 36 as a passenger seat is for exemplary purposes only, and accessory 36 may constitute any number of accessories known in the art. For example, accessory 36 may comprise a luggage rack or a mounting assembly for saddle bags. In the present embodiment, seat 36 includes a main body 130 and a removable member 132. Main body 130 is generally padded as would be known in the art and includes an upper surface 140 and a lower surface opposite thereof (not shown). Upper surface 140 generally has a smooth contour and encompasses the pad of the seat. Conversely, the lower surface generally comprises a flat metallic member and includes a plurality of apertures (not shown). In the present embodiment of the invention, main body 130 further includes an opening 142. The opening 142 extends through the seat 36 and is sized and configured to receive removable member 132. Removable member 132 is sized and configured to be inserted into and removed from opening 142.

Now that a majority of the components comprising an embodiment of the fender assembly 22 of the present invention have been described, the steps in assembling the embodiment of the fender assembly 22, described above, will now be set forth in detail.

Figure 4:
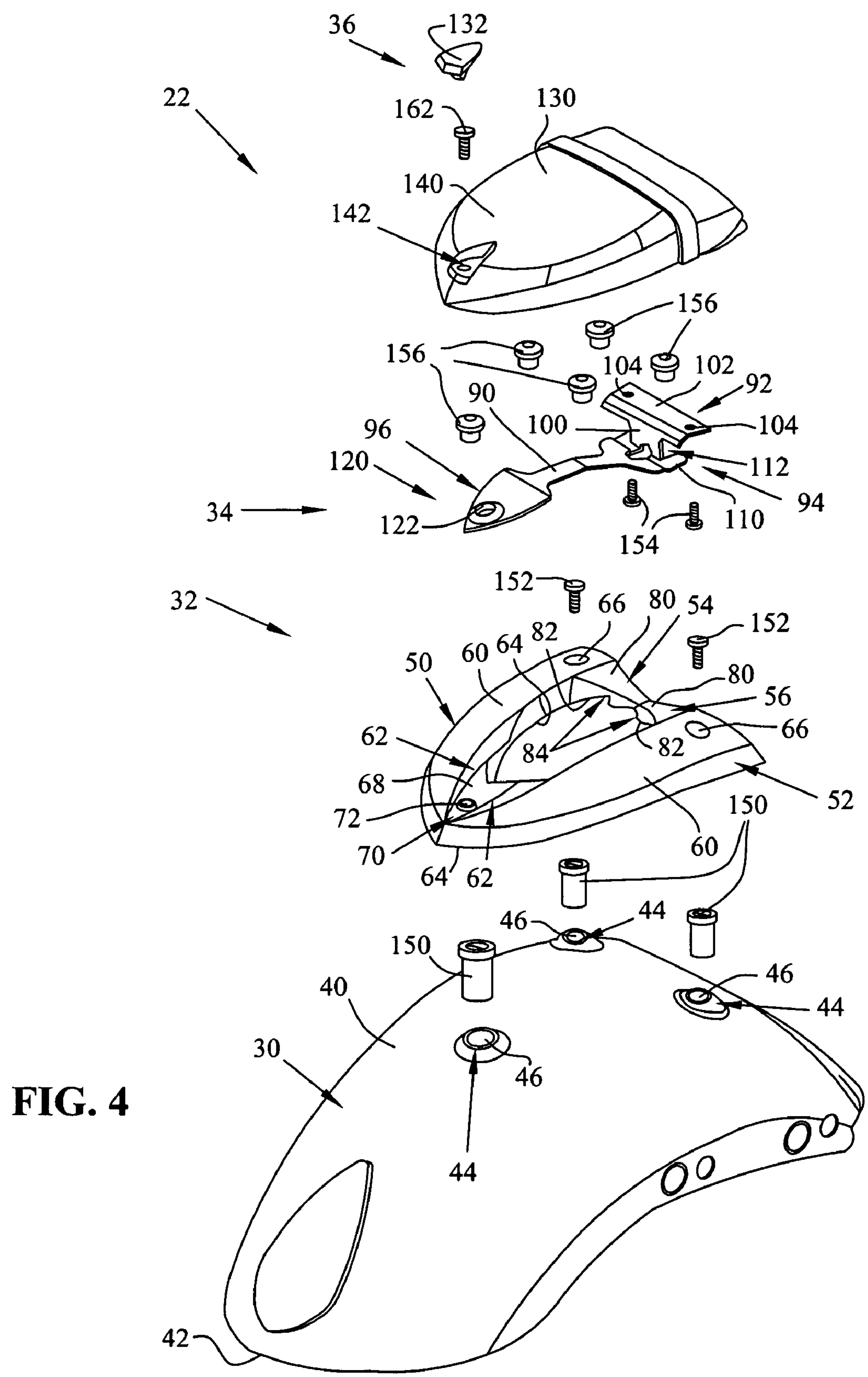
FIG. 4 is a exploded perspective view of an embodiment of the present invention.

With reference to FIGS. 2-4, FIG. 2 depicts the joining of attachment member 32 to fender 30. In order to achieve this, a riv-nut 150 is inserted into each of the apertures 46 of the mounting members 44. As would be understood by one with ordinary skill in the art, the riv-nuts 150 may be crimped so as to be retained within aperture 46. Riv-nuts 150 include internal threads (not shown) configured to allow for the receipt of a fastener, such as a screw. Once the riv-nuts 150 are secured within the apertures 46, attachment member 32 is placed upon fender 30. The apertures 66 of attachment member 32 should align with the apertures 46 of two of the mounting members 44 of upper surface 40. Once attachment member 32 is properly aligned with fender 30, fasteners 152 may be inserted into the apertures 66 and threaded into the riv-nuts 150 positioned within the mounting members 44.

FIG. 3 depicts the attachment of bracket 34 to accessory 36. Specifically, apertures 104 of support portion 92 must be aligned with apertures (not shown) present on the under surface of accessory 36. Fasteners 154 fasten the bracket 34 to the accessory 36 once the apertures have been aligned. It should be noted that when bracket 34 is properly fastened to accessory 36, aperture 122 aligns with opening 142.

A plurality of rubber supports or grommets 156 may also be attached to the under surface of accessory 36 in any manner. For example, an adhesive may be employed to secure the rubber supports 156 to the accessory 36. In other embodiments of the invention, the accessory 36 may include a plurality of apertures (not shown) and fasteners (not shown) may be utilized to secure the rubber supports 156 to the underside of the accessory 36. Moreover, in embodiments of the invention, the rubber supports 156 may include a metallic portion thereby allowing the rubber supports 156 to be ultrasonically welded to the metallic underside of the accessory 36. It should be noted also that if desired the rubber supports 156 may be attached to the underside of the accessory 36 prior to the attachment of bracket 34 to the underside of accessory 36.

Figure 5:
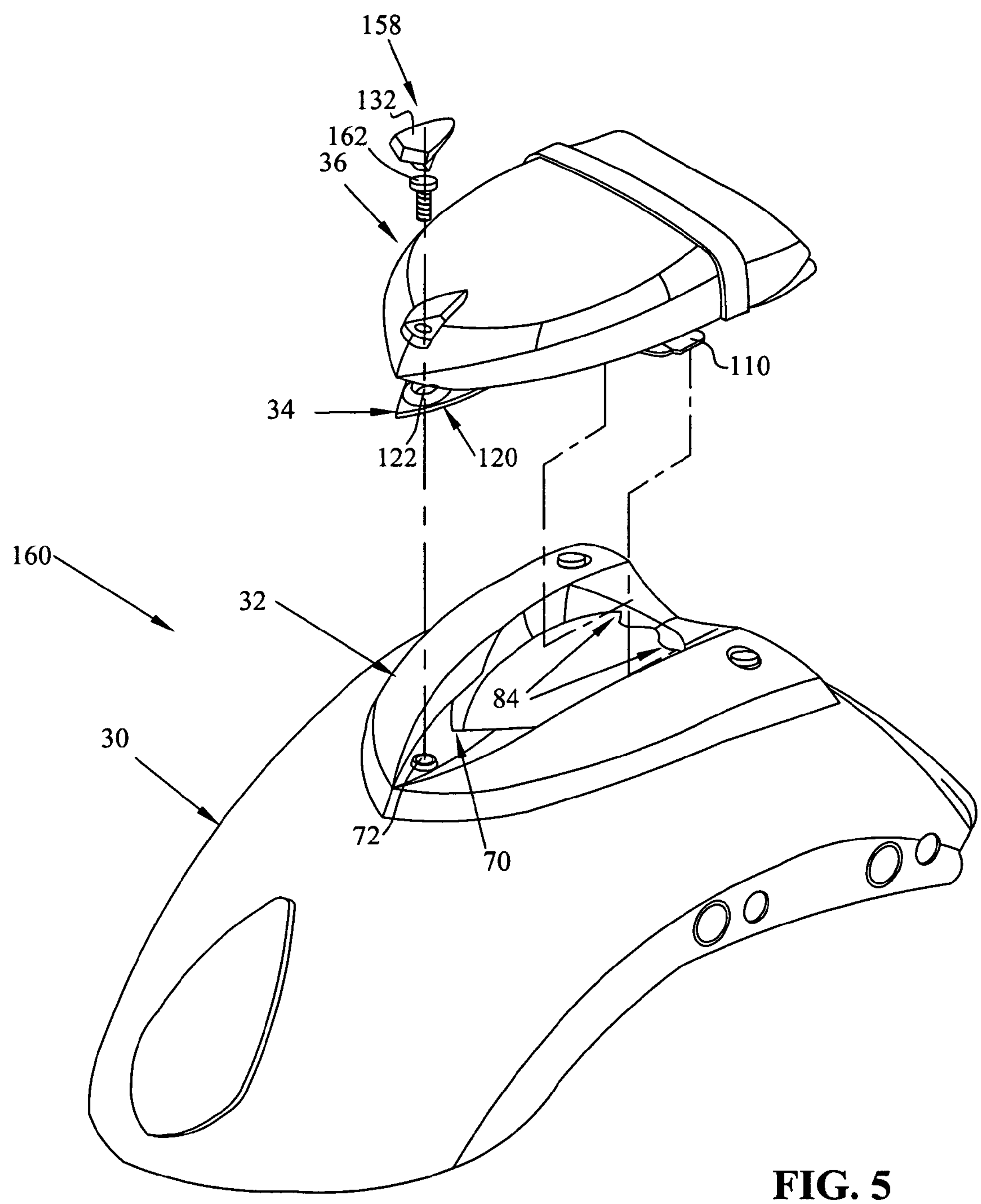
FIG. 5 depicts the steps in assembling an embodiment of the present invention.

With reference now to FIG. 5, the combination of the accessory 36 and bracket assembly 34, now generally indicated by numeral 158, may be attached to the combination of the fender 30 and attachment member 32, now generally indicated by numeral 160. In order to achieve this, the removable member 132 is removed from accessory 36, thereby exposing opening 142. Next, combination 158 is positioned angularly such that protrusions 110 align with slots 84. Once protrusions 110 and slots 84 have been aligned, the combination 158 may be moved forward so that protrusions 110 slide into slots 84. Combination 158 has been properly located with respect to combination 160 upon the positioning of locating portion 96 within recess 70.

The positioning of the locating portion 96 within the recess 70 ensures that opening 142, aperture 122 and aperture 72 are all aligned with the aperture 46 (FIG. 2) of the rear most mounting member 44. This alignment of the opening 142 and the apertures 122, 72, 46 allows for the insertion of fastener 162 into aperture 46 through opening 142. In doing so, fastener 162 will extend through accessory 36, bracket 34, attachment member 32 and fender 30. Once fastener 162 has been threaded into mounting member 44, fastener 162 succeeds in joining the accessory 36, and bracket 34 to attachment member 32 and fender 30. Upon complete insertion of fastener 162, removable member 132 may again be added to accessory 36 in order to conceal fastener 162 and opening 142. The placement of removable member 132 into accessory 36 also prevents the inadvertent removal of fastener 162.

The present embodiment of the invention allows an operator to remove the accessory by first removing removable member 132 thereby exposing fastener 162. Fastener 162 may then be removed from fender 30 and attachment member 32, in order to allow for the lifting of the rear of accessory 36 so that locating portion 96 becomes disengaged from recess 70. Accessory 36 may then be slid rearward in such a manner so as to remove the protrusions 110 from the slots 86. Combination 158 may then be removed, thereby exposing combination 160. Fastener 162 may be inserted into the aperture 46 of the rear most mounting member 44 thereby presenting an ornamental configuration.

In the present embodiment of the invention, the presence of the attachment member 32 on fender 30 prevents the rubber supports 156 from damaging the paint of the fender 30 when the fender 30 supports the accessory 36. Specifically, the rubber supports 156 ride intermediate accessory 36 and attachment member 32. In addition, the chrome finish of the attachment member 32 provides a decorative styling to the fender 30 when accessory 36 is removed.

It should be noted that in embodiments of the invention, the attachment member 32 may be attached to the fender 30 in a permanent manner. In addition, in embodiments of the invention, the attachment member 32 and the fender 30 may be a single unit and need not be two separate components.

The accessory 36 may also comprise any number of different components. For example, accessory 36 may be a luggage rack. In embodiments of the invention, the luggage rack may be attached to the fender 30 and attachment member 32 in the same manner as the seat described above. In order to achieve this, a bracket 34 may be attached to the underside of the luggage rack.

It should be noted that in embodiments of the invention, the bracket 34 may be mounted to the accessory 36 in a more permanent fashion. For example, in addition to fasteners 154, an adhesive may be used. Moreover, the bracket 34 may be welded directly to an accessory 36. In addition, in embodiments of the invention, each accessory 36 may be attached to a different bracket 34, thereby allowing for a quick switch between accessories.

While this invention has been described as having an exemplary design, the present invention may be further modified within the spirit and scope of this disclosure. The application is intended, therefore, to cover any variations, uses, or adaptations of the invention using its general principles. Further, this application is intended to cover such departures from the present disclosure as come within known or customary practice in the art to which this invention pertains.

What is claimed is:

1. An assembly for attaching an accessory to a fender including:

- a bracket including a locating portion and a mating portion, said bracket being attachable to the accessory;
- an attachment member being attachable to the fender, and including a receiving area for receiving and retaining said bracket;
- wherein said bracket attaches the accessory to the fender, and when attached, said bracket is substantially hidden from view;
- at least one mounting member attachable to the fender and for mounting said attachment member;
- the bracket locating portion includes an aperture aligned with at least one of said mounting members, and the accessory is attached by way of a fastener extending through said aperture of said locating portion, and into said at least one mounting member.

2. The assembly as set forth in claim 1, wherein said mating portion includes at least one protrusion.

3. The assembly as set forth in claim 2, wherein said at least one protrusion is profiled as a tongue extension.

4. The assembly as set forth in claim 2, wherein said receiving area is profiled to include at least one slot configured to receive said at least one protrusion.

5. The assembly as set forth in claim 4, further comprising at least two protrusions and at least two slots receiving said protrusions.

6. The assembly as set forth in claim 1, wherein said attachment member is plated with chrome.

7. The assembly as set forth in claim 6, wherein said chrome plated attachment member is permanently attached to said fender.

8. The assembly as set forth in claim 1, wherein said accessory is a passenger seat.

9. The assembly as set forth in claim 1, wherein said accessory is attached by way of the fastener extending through said accessory, said aperture of said locating portion, and into said at least one mounting member.

10. A motorcycle, comprising:

- a frame;
- a power train mounted to said frame for powering said motorcycle;
- a front wheel and a rear wheel;
- a rear fender positioned over said rear wheel;
- a bracket including a locating portion and a mating portion;
- an attachment member mounted to said fender and having a receiving area for receiving and retaining said bracket; and
- an accessory joined to said bracket;
- wherein, the bracket is substantially received within said receiving area and said accessory is substantially flush mounted to said attachment member.

11. The motorcycle as set forth in claim 10, wherein said attachment member is plated with chrome.

12. The motorcycle as set forth in claim 10, wherein said fender includes a plurality of mounting members allowing for the mounting of said attachment member to said fender.

13. The motorcycle as set forth in claim 12, wherein said receiving area receives said locating portion of said bracket.

14. The motorcycle as set forth in claim 13, wherein said attachment member further includes at least one slot configured to receive said mating portion of said bracket.

15. The motorcycle as set forth in claim 10, wherein the locating portion includes a shaped portion and an aperture positioned within said shaped portion.

16. The motorcycle as set forth in claim 15, wherein said receiving area is configured to receive said shaped portion.

* * * * *